W. E. RHODES.
Cotton-Planters.
No. 135,290.
Patented Jan. 28, 1873.
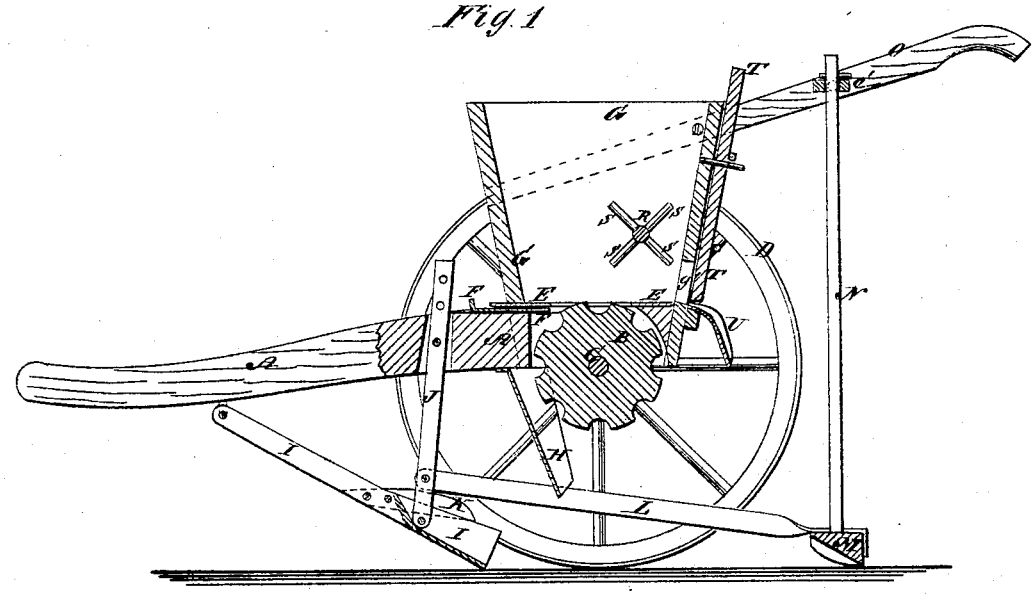
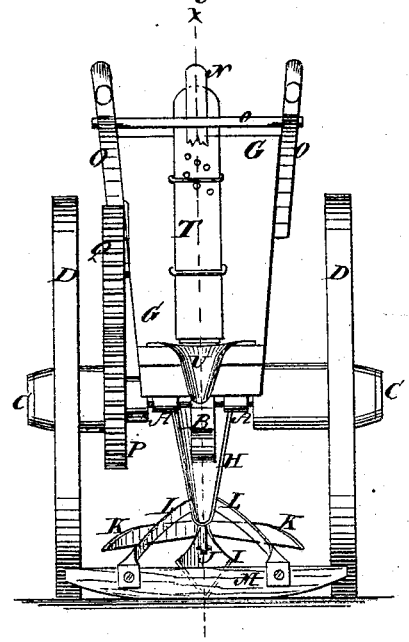

UNITED STATES PATENT OFFICE.

WILLIAM E. RHODES, OF DARLINGTON COURT-HOUSE, SOUTH CAROLINA.

IMPROVEMENT IN COTTON-PLANTERS.

Specification forming part of Letters Patent No. 135,290, dated January 28, 1873.

*To all whom it may concern:*

Be it known that I, WILLIAM E. RHODES, of Darlington Court-House, in the county of Darlington and State of South Carolina, have invented a new and useful Improvement in Cotton-Planter, of which the following is a specification:

Figure 1 is a longitudinal vertical section of my improved planter taken through the line *x x*, Fig. 2. Fig. 2 is a rear view of the same, part being broken away to show the construction.

Similar letters of reference indicate corresponding parts.

The invention consists in improving cotton-planters, as hereinafter fully described and subsequently claimed.

A is the beam, the rear end of which is made wide and is slotted longitudinally to receive the dropping-wheel B, which is detachably attached to the center of the axle C. The axle C revolves in bearings attached to the under side of the slotted rear end of the beam A. To the end of the axle C are attached the transporting-wheels D in such a way that they may carry the axle C and dropping-wheel B with them in their revolution. The dropping-wheel B is made of such a size that its upper side may project into the hopper to take out the seed. In the face of the dropping-wheel B are formed notches to receive the seed and carry it out of the hopper. These notches, when the seed is to be dropped in drills, are continued all around the wheel. When the seed is to be dropped in hills one or more notches are made in the wheel, according to the required distance apart of the hills. To the upper side of the slotted rear end of the beam A is attached a slotted metallic plate, E, to prevent the beam A from being worn by the wheel B, and to prevent any seed from escaping at the sides of the said wheel B. The size of the opening at the forward end of the slot in the beam A, through which the seed is carried out by the wheel B, is regulated by an adjustable slide, F, placed in a groove or recess beneath the forward part of the plate E, as shown in Fig. 1. G is the hopper to receive the seed, and which is attached to the widened rear end of the beam A, so that the said beam may serve as a bottom to the hopper. H is a spout attached to the lower side of the beam at the forward end of the slot in said beam to receive the seed from the wheel B, and guide it into the channel made by the drill-opener I. The rear part of the drill-opener I is made V-shaped in its cross-section, as shown in Fig. 2, and its forward end is pivoted to the forward part of the beam A, as shown in Fig. 1. To the drill-opener I is pivoted the lower end of a bar, J, the upper part of which passes up through a hole or mortise in the beam A a little in front of the hopper G, and has several holes formed in it to receive a pin, so that the drill-opener I may be readily adjusted to open the drill to the desired depth. To the opposite sides of the drill-opener I are attached wings K to push back clods, coarse manure, and other substances that might impede the proper operation of the machine. To the lower part of the bar J are pivoted the forward ends of the bars L, the rear ends of which are spread apart and are attached to the ends of the covering-block M, the under side of which is concaved to give the proper form to the top of the ridge. To the middle part of the upper side of the covering-block M is attached the lower end of the bar N, which passes up through a hole in the round or cross-bar O' of the handles O, and has a number of holes formed through it to receive the adjusting-pin, by adjusting which the coverer may be adjusted to bear with any desired force upon the ground, or raised from the ground, as may be desired. The forward ends of the handles O are secured to the opposite sides of the upper part of the hopper G. To the axle C, at one side of the hopper G, is attached a gear-wheel, P, the teeth of which mesh into the teeth of the gear-wheel Q attached to the outer end of the shaft R. The shaft R revolves in bearings in the sides of the hopper G, and to it, within said hopper, are attached radial fingers S, which, as the machine is drawn forward, keep the seed in the lower part of the hopper stirred up so that it may be carried out by the wheel B uniformly. In the rear side of the hopper G, just above the bottom plate E, is formed a hole or opening, $g'$, which is closed by a slide, T, working in keepers attached to the outer side of the said hopper, and which is secured in position to close the opening $g'$ wholly or partially, or to leave it fully open, by a pin which passes through holes in the slide T and hopper G. To the rear side of the hopper, at the lower end of the opening $g'$, is attached a spout, U, to receive the seed from the said opening and give it such a direction that it will fall into the drill. The slide T is designed for use in regulating the amount of seed sown, so that the machine may be adjusted to sow more or less seed, as may be desired, without stopping the horse.

In the same field will often be found soil in different degrees of tilth and preparation, and in proportion to the roughness of the ground must the quantity of seed be increased to allow for failure in growth. By the quick adjustment of slide T an additional supply of seed is distributed in proportion to the roughness of each locality.

Having thus described my invention, I claim as new and desire to secure by Letters Patent—

A hopper having aperture $g'$, adjustable slide T, and spout U at the rear thereof, and provided with revolving fingers S on the inside, as described, and for the purpose set forth.

WILLIAM EDWIN RHODES.

Witnesses:
  J. G. GATLIN,
  JAMES BELL.